United States Patent [19]
Casey

[11] 3,943,791
[45] Mar. 16, 1976

[54] SINGLE LEVER CONTROL FOR MULTI-VALVE OPERATION
[75] Inventor: Robert Casey, Washington, Ill.
[73] Assignee: Caterpillar Tractor Co., Peoria, Ill.
[22] Filed: June 12, 1972
[21] Appl. No.: 261,606

[52] U.S. Cl............. 74/471 XY; 74/491; 137/636.2
[51] Int. Cl.² .......................................... G05G 9/02
[58] Field of Search........... 74/471 XY, 471 R, 491, 74/566; 180/90.6; 137/636.2

[56] References Cited
UNITED STATES PATENTS

| | | | |
|---|---|---|---|
| 1,576,492 | 3/1926 | Young ............................... | 180/90.6 |
| 1,840,938 | 1/1932 | Duffy................................. | 180/90.6 |
| 3,388,609 | 6/1968 | Miller................................ | 74/471 XY |
| 3,625,082 | 12/1971 | Muller et al. .................... | 74/471 XY |

Primary Examiner—Allan D. Hermann
Attorney, Agent, or Firm—Phillips, Moore, Weissenberger Lempio & Strabala

[57] ABSTRACT

An articulated handle comprises a firm arm pivotally mounted on a stationary support and a second arm pivotally mounted on the first arm to pivot perpendicular relative to pivotal movements of the first arm. A lever is also pivotally mounted on the support and a connecting rod is pivotally interconnected between the lever and the second arm. The valve stems of adjacent control valves are operatively connected to the first arm and to the lever, respectively, whereby movement of the handle in one direction will actuate one valve and movement of the handle in a second, perpendicular direction will reciprocate the other valve.

13 Claims, 4 Drawing Figures

SINGLE LEVER CONTROL FOR MULTI-VALVE OPERATION

BACKGROUND OF THE INVENTION

Hydraulic circuits, adapted to control the actuation of various cylinders and the like employed on earthworking vehicles, oftentimes utilize a single lever control for alternately or simultaneously actuating two or more valves. Many such controls are bulky, complex, expensive to manufacture and do not always provide the precise control required for actuation purposes.

SUMMARY OF THE INVENTION

An object of this invention is to provide a compact, non-complex and economical single lever control adapted to actuate two or more valves individually or simultaneously.

The single lever control embodiment comprises a stationary support having the first arm of an articulated handle pivotally mounted thereon for pivotal movement about a first axis. The handle's second arm is pivotally mounted on the first arm for rotation about a second axis, disposed transversely relative to the first axis. An extension, connected to the first arm, is adapted for attachment to the stem of a first valve whereas connecting means, pivotally connected between the support and the second arm, is adapted for attachment to the stem of a second valve whereby movement of the handle about the first axis will reciprocate the first valve and movement of the handle about the second axis will reciprocate the second valve.

BRIEF DESCRIPTION OF THE DRAWINGS

Further objects of this invention will become apparent from the following description and accompanying drawings wherein.

DETAILED DESCRIPTION

Figure 1:
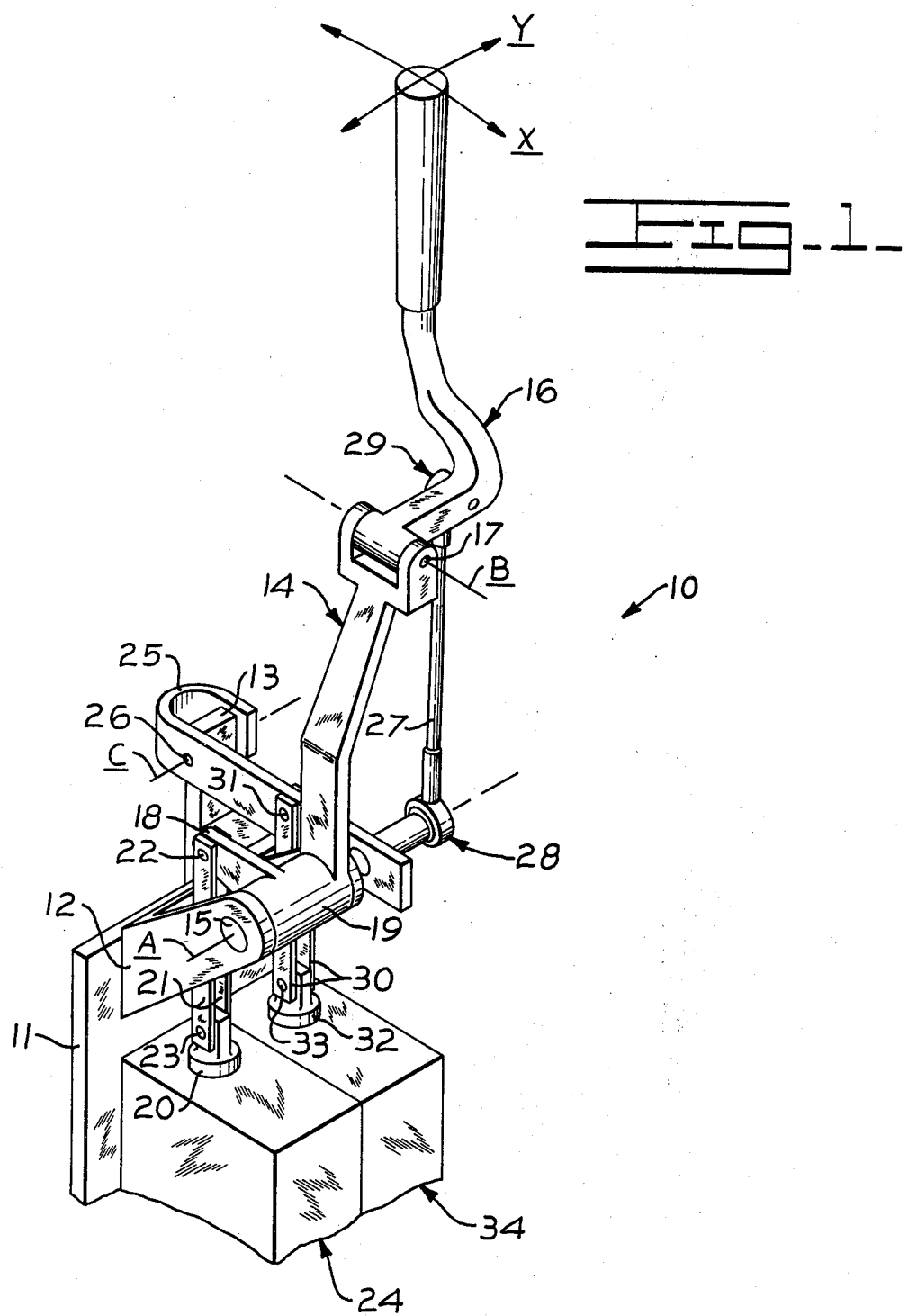
FIG. 1 is an isometric view of a single lever control embodying this invention.
Figure 2:
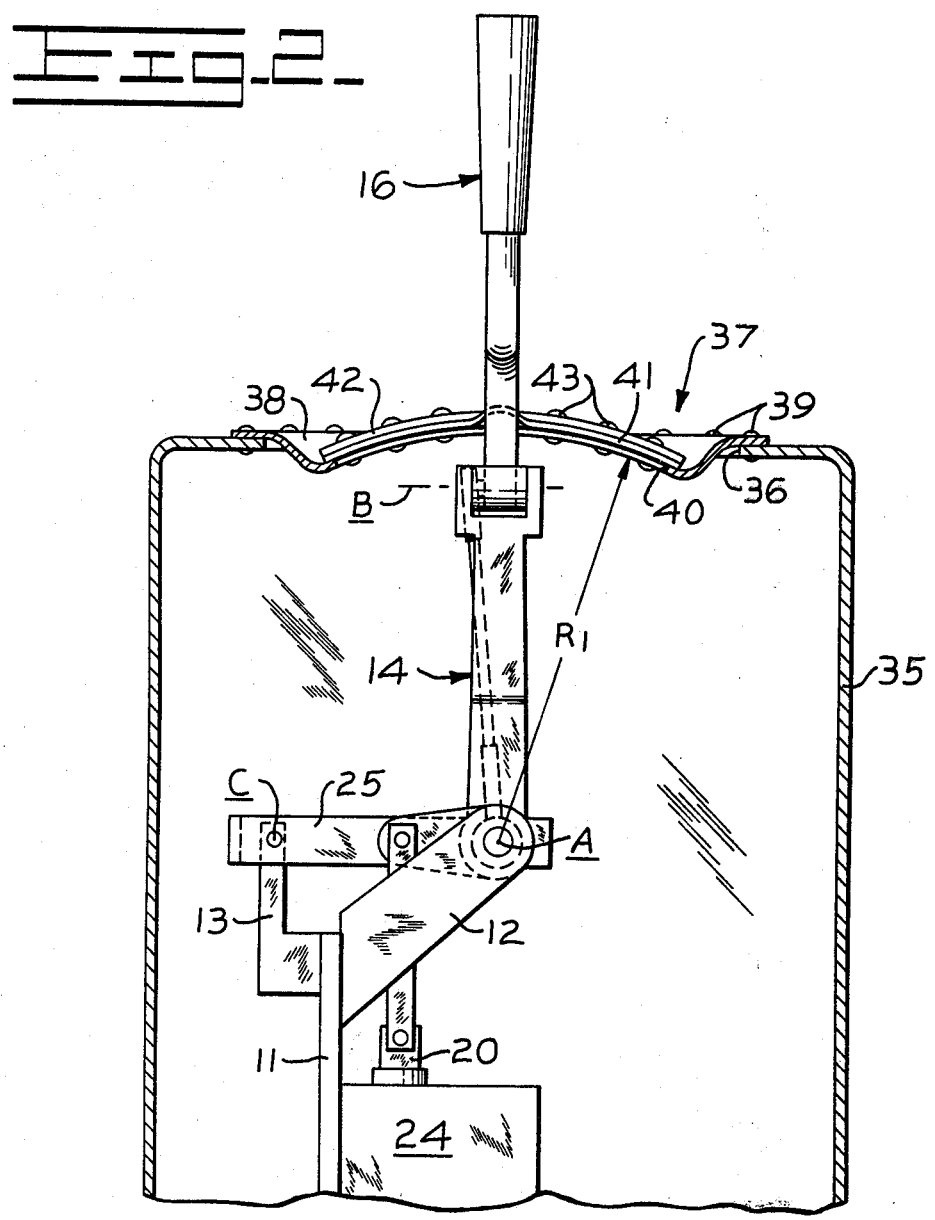
FIG. 2 is a side elevational view of the single lever control as it would appear mounted in an enclosure, shown in cross section.
Figure 3:
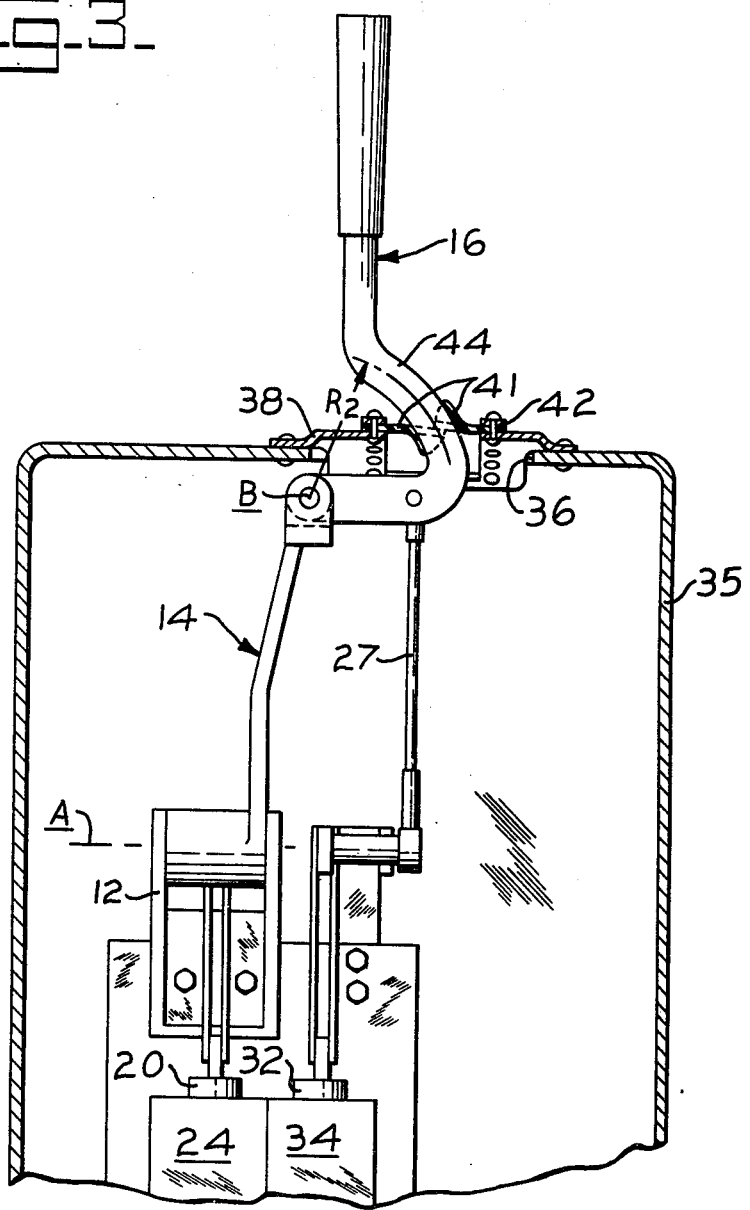
FIG. 3 is a view similar to FIG. 2, but showing the single lever control and enclosure in front elevation.

FIGS. 1–3 illustrate a single lever control 10 comprising an upright stationary support 11 having a bifurcated first bracket 12 and an L-shaped second bracket 13 secured on opposite sides thereof. An aritculated handle comprises a first arm 14 mounted on bracket 12 by a pivot pin 15 for pivotal movement about a first axis A. A second arm 16 is mounted on the first arm by a pivot pin 17 for pivotal movements about a second axis B, preferably disposed in perpendicular and vertically spaced relationship with respect to axis A.

An extension 18 is secured to first arm 14 by means of a common hub 19 to thus form a bellcrank therewith. The extension is pivotally connected to a valve stem 20 by first linkage means comprising a pair of links 21. The upper ends of the links are connected to the extension by a pivot pin 22 whereas the lower ends of the links are connected to the valve stem by a pivot pin 23. The valve stem is reciprocally mounted for linear movements in the housing of a first control valve 24 to selectively move a valve spool (not shown) or the like to communicate hydraulic fluid therethrough.

A lever 25 of a connecting means is pivotally mounted on support bracket 13 by a pin 26 for pivotal movements about a third axis C, preferably disposed perpendicular to second axis B and parallel to first axis A. The connecting means further comprises a connecting rod 27 universally interconnected between the lever and second arm 16 of the handle by ball and socket connections 28 and 29, respectively. A second linkage means, comprising a pair of links 30, is connected to lever 25 by a pivot pin 31 and to the upper end of a valve stem 32 by a pivot pin 33. The second valve stem is reciprocally mounted for linear movements in the housing of a second control valve 34 to selectively move a valve spool (not shown) or the like to communicate hydraulic fluid therethrough.

Referring to FIGS. 2 and 3, the single lever control is mounted within a stationary enclosure 35 defining a horizontally disposed elongated opening 36 through the top thereof. A combined sealing and handle guide means 37 comprises an arcuately shaped cover plate 38 secured over the opening by rivets 39 or the like. The centrally disposed arcuately shaped portion of the cover and an elongated slot 40 are preferably defined by a radius $R_1$ having its center at first axis A. The arcuately shaped slot extends in the general direction of axis B and is formed through the cover plate to conform to the handle movements in the direction of such axis.

A pair of flexible rubber or plastic strips or sealing means 41 are disposed over slot 40 and are secured between cover 38 and parallel metal strips 42 by rivets 43. As more clearly shown in FIG. 3, an arcuate portion 44 of second arm 16 protrudes through a slit defined between strips 41 so that the edge of a first strip faces upwardly and the edge of the second strip faces downwardly to substantially encapsulate such first arm portion therebetween. Such arcuate portion of the handle is preferably defined by a radius $R_2$ having its center at second pivot axis B to permit the first arm 16 of the handle to be pivoted about the axis with little, if any, transverse movement.

Figure 4:
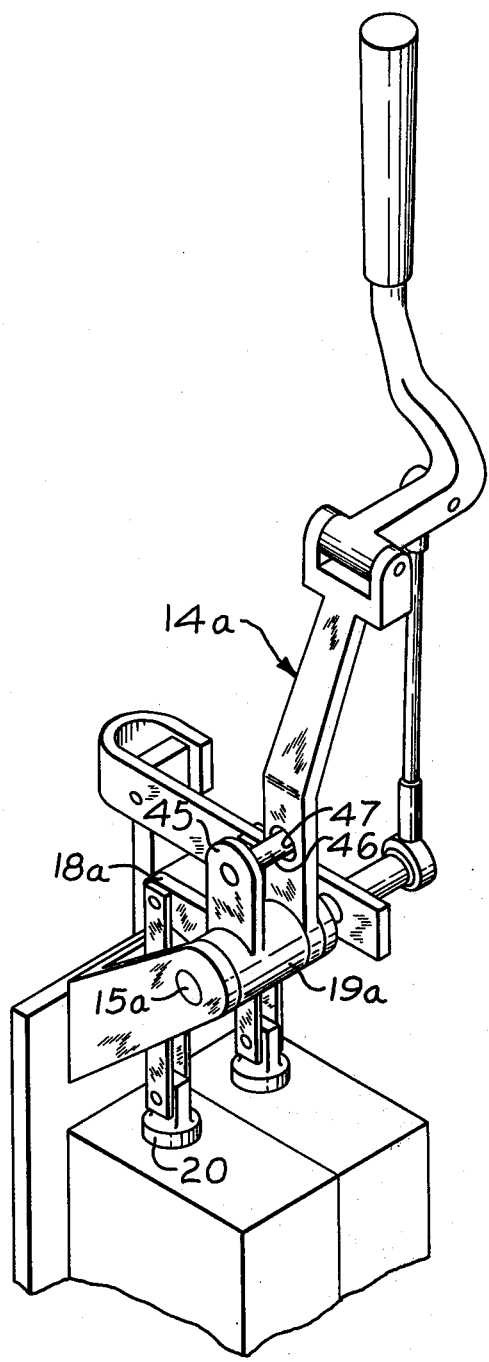
FIG. 4 is a view similar to FIG. 1, but showing a modification of the single lever control.

FIG. 4 illustrates a slight modification of the FIGS. 1–3 single lever control wherein like numerals are used to depict corresponding parts with numerals depicting modified constructions in FIG. 4 being accompanied by an *a*. In particular, a first arm 14*a* of the handle and a separate hub 19*a* are both pivotally mounted on a pivot pin 15*a*. A lug 45 is secured to hub 19*a* and has a pin 46 secured thereon which loosely engages an aperture 47 formed through first arm 14*a*. Thus, an actuating extension 18*a* for first valve stem 20 defines a bellcrank with hub 19*a* and lug 45 that is loosely connected to first arm 14*a* of the handle by interengaging coupling means comprising pin 46 and aperture 47.

In operation, the operator may pivot the handle of the FIGS. 1–3 single lever control in the X direction illustrated in FIG. 1 to pivot the handle about the first axis A. Such movement will pivot extension 18 about such axis to selectively reciprocate valve stem 20 to actuate control valve 24. When the handle is moved in the Y direction, perpendicular to the X direction, first arm 16 of the handle will pivot about second axis B to in turn pivot lever 25 of the connecting means about third axis C. Valve stem 32 of valve 34 will thus reciprocate to selectively direct hydraulic fluid through control valve 34. It should be noted that the handle may be moved in a compound direction, intermediate directions X and Y, to simultaneously control the movements of first and second valve stems 20 and 32, respectively.

Due to the arcuate shape of cover 38 and handle portion 44, defined by radii $R_1$ and $R_2$ respectively, the handle can be manipulated in either or both the X and Y directions without being displaced with respect to slot 40. Such construction aids in maintaining the sealing means, comprising rubber flaps 41, in a close encapsulating position around handle portion 44 to prevent the infiltration of dirt or the like into enclosure 35 and to isolate noise generated within the enclosure.

The FIG. 4 single lever control embodiment functions substantially in the same manner except that interengaging coupling means comprising pin 46 and aperture 47 loosely connect first arm 14a of the handle to extension 18a.

What is claimed is:

1. A single lever control adapted to actuate separate valves comprising
    a stationary support
    an articulated handle comprising a first arm pivotally mounted on said support for pivotal movement about a first axis and a second arm pivotally mounted on said first arm for pivotal movement about a second axis disposed transversely relative to said first axis,
    an extension, adapted for attachment to a stem of a first valve, connected to said first arm by interengaging coupling means and extending transversely of said first axis, and
    connecting means, adapted for attachment to a stem of a second valve, connected to said second arm, said connecting means being pivotally connected to said support for pivotal movement about a third axis disposed transversely of said second axis and at least generally parallel to said first axis.

2. The invention of claim 1 wherein said connecting means comprises a lever having its first end pivotally mounted on said support and its second end pivotally connected to a connecting rod, said connecting rod further pivotally connected to said second arm.

3. The invention of claim 1 wherein said first and second axes are substantially positioned in perpendicular and vertically spaced relationship relative to each other.

4. The invention of claim 1 further comprising first and second control valves each having a stem reciprocally mounted therein for linear movement in a direction transverse to said first and second axes and first and second linkage means pivotally interconnecting said extension and said connecting means, respectively, with a respective one of said valve stems whereby pivotal movement of said handle about said first axis will reciprocate one of said valve stems and pivotal movement of said handle about said second axis will reciprocate the other one of said valve stems.

5. The invention of claim 1 wherein said extension is secured to said first arm.

6. The invention of claim 1 further comprising an enclosure having said single lever control mounted therein, said enclosure comprising a cover plate defining an elongated slot therethrough and flexible sealing means, defining a normally closed elongated slit therethrough, normally covering said slot, the second arm of said handle protruding through said slot and said slit.

7. The invention of claim 6 wherein an arcuate portion of said cover plate and said slot are at least generally defined by a radius having said first axis as its center.

8. The invention of claim 6 wherein an arcuate portion of said second arm, protruding through said slit, is at least generally defined by a radius having said second axis as its center.

9. A lever control, having an articulated handle comprising a first arm pivotally mounted therein and a second arm pivotally mounted on said first arm for pivotal movement transverse to pivotal movement of said first arm, mounted in an enclosure comprising a cover plate defining an arcuate slot therethrough and flexible sealing means, defining a normally closed elongated slit therethrough, normally covering said slot, the second arm of said handle protruing through said slot and said slit and said first arm mounted for pivotal movement about an axis which is the center for a radius at least generally defining said arcuate slot.

10. A lever control, having a handle pivotally mounted therein, mounted in an enclosure comprising a cover plate defining a slot therethrough and flexible sealing means, defining a normally closed slit therethrough, normally covering said slot, said handle protruding through said slot and said slit and mounted for pivotal movement about an axis, disposed within said enclosure, which is the center for a radius at least generally defining an arcuate portion of said handle which protrudes through said slot and said slit whereby the arcuate path of travel of said arcuate portion through said slot and said slit will remain substantially constant upon manipulation of said handle.

11. A single lever control adapted to actuate separate valves comprising
    a stationary support,
    an articulated handle comprising a first arm pivotally mounted on said support for pivotal movement about a first axis and a second arm pivotally mounted on said first arm for pivotal movement about a second axis disposed transversely relative to said first axis,
    an extension, adapted for attachment to a stem of a first valve, connected to said first arm by interengaging coupling means and extending transversely of said first axis, said interengaging coupling means comprising means forming an aperture in said first arm and a pin, extending in the general direction of said first axis, secured to said extension and positioned in said aperture, and
    connecting means, adapted for attachment to a stem of a second valve, pivotally connected to said support and further pivotally connected to said second arm.

12. A single lever control adapted to actuate separate valves comprising
    a stationary support,
    an articulated handle comprising a first arm pivotally mounted on said support for pivotal movement about a first axis and a second arm pivotally mounted on said first arm for pivotal movement about a second axis disposed transversely relative to said first axis,
    an extension, adapted for attachment to a stem of a first valve, connected to said first arm and extending transversely of said first axis,
    connecting means, adapted for attachment to a stem of a second valve, pivotally connected to said support and further pivotally connected to said second arm, and an enclosure having said single lever control mounted therein, said enclosure comprising a cover plate defining an elongated slot therethrough and flexible sealing means, defining a normally closed elongated slit therethrough, normally covering said slot, the second arm of said handle protruding through said slot and said slit, an arcuate portion of said second arm, protruding through said slit, being at least generally defined by a radius having said second axis at its center.

13. A single lever control adapted to actuate separate valves comprising a stationary support an articulated handle comprising a first arm pivotally mounted on said support for pivotal movement about a first axis and a second arm pivotally mounted on said first arm for pivotal movement about a second axis disposed transversely relative to said first axis, an extension, adapted for attachment to a stem of a first valve, connected to said first arm and extending transversely of said first axis, connecting means, adapted for attachment to a stem of a second valve, pivotally connected to said support and further pivotally connected to said support for pivotal means being pivotally connected to said support for pivotal movement about a third axis disposed transversely of said second axis and at least generally parallel to said first axis and an enclosure having said single lever control mounted therein, said enclosure comprising a cover plate defining an elongated slot therethrough and flexible sealing means, defining a normally closed elongated slit therethrough, normally covering said slot, the second arm of said handle protruding through said slot and said slit and wherein an arcuate portion of said cover plate and said slot are at least generally defined by a radius having said first axis as its center.

* * * * *